(12) United States Patent
Galecki et al.

(10) Patent No.: US 10,917,700 B2
(45) Date of Patent: Feb. 9, 2021

(54) ESTIMATING BANDWIDTH SAVINGS FOR ADAPTIVE BIT RATE STREAMING

(71) Applicant: MICROSOFT TECHNOLOGY LICENSING, LLC, Redmond, WA (US)

(72) Inventors: Piotr Galecki, Lexington, MA (US); Raghavan Rajagopalan, Billerica, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/264,887

(22) Filed: Feb. 1, 2019

(65) Prior Publication Data

US 2019/0246182 A1   Aug. 8, 2019

Related U.S. Application Data

(60) Provisional application No. 62/625,421, filed on Feb. 2, 2018.

(51) Int. Cl.
*H04N 21/647* (2011.01)
*H04L 29/06* (2006.01)

(52) U.S. Cl.
CPC ... *H04N 21/64792* (2013.01); *H04L 65/4084* (2013.01); *H04L 65/4092* (2013.01);
(Continued)

(58) Field of Classification Search
CPC ....... H04N 21/64792; H04N 21/64769; H04N 21/64738; H04L 65/4092; H04L 65/4084; H04L 65/605; H04L 65/80; H04L 65/602
See application file for complete search history.

(56) References Cited

U.S. PATENT DOCUMENTS 6,557,030 B1   4/2003  Hoang
6,950,624 B2   9/2005  Kim et al.
(Continued)

OTHER PUBLICATIONS

Amram, N. et al., "QoE-based Transport Optimization for Video Delivery over Next Generation Cellular Networks", Computers and Communications (ISCC), IEEE Symposium, 6 pgs. (2011).
(Continued)

*Primary Examiner* — Arvin Eskandarnia
*Assistant Examiner* — Chhian (Amy) Ling
(74) *Attorney, Agent, or Firm* — Ray Quinney & Nebeker, P.C.; Thomas M. Hardman; Sunah K. Lee

(57) ABSTRACT

Example implementations involve systems and methods for determining bandwidth savings from a rate-limiting process. A network optimization node can determine a first reference characteristic of a first portion of adaptive bit rate (ABR) media data transmitted from a first content provider to a first user equipment while rate-limiting is disabled and store in an estimation module database associated with the network optimization node, the first reference characteristic in association with the first content provider. The node can determine a first rate-limited characteristic of a second portion of the ABR media data transmitted from the first content provider to at least one of the first user equipment and a second user equipment while rate-limiting is enabled and calculate a first bandwidth savings for the first content provider associated with rate-limiting being enabled based on a difference between the first reference characteristic and the first rate-limited characteristic.

14 Claims, 5 Drawing Sheets

(52) U.S. Cl.
CPC .......... *H04L 65/602* (2013.01); *H04L 65/605* (2013.01); *H04L 65/80* (2013.01); *H04N 21/64738* (2013.01); *H04N 21/64769* (2013.01)

(56) References Cited

U.S. PATENT DOCUMENTS

| | | | |
|---|---|---|---|
| 7,346,840 | B1 | 3/2008 | Ravishankar et al. |
| 7,466,694 | B2 | 12/2008 | Xu et al. |
| 7,734,746 | B2 | 6/2010 | Ng et al. |
| 7,796,514 | B2 | 9/2010 | Noriega |
| 7,962,181 | B2 | 6/2011 | Gielow et al. |
| 7,991,904 | B2 | 8/2011 | Melnyk et al. |
| 8,064,909 | B2 | 11/2011 | Spinelli et al. |
| 8,516,144 | B2 | 8/2013 | Hsu |
| 8,527,647 | B2 | 9/2013 | Gopalakrishnan |
| 2002/0023048 | A1 | 2/2002 | Buhannic et al. |
| 2002/0154751 | A1 | 10/2002 | Thompson et al. |
| 2002/0169797 | A1 | 11/2002 | Hegde et al. |
| 2003/0171114 | A1 | 9/2003 | Hastings |
| 2003/0187982 | A1 | 10/2003 | Petit |
| 2004/0131023 | A1 | 7/2004 | Auterinen |
| 2004/0267758 | A1 | 12/2004 | Katsurashima |
| 2005/0136832 | A1 | 6/2005 | Spreizer |
| 2006/0013191 | A1 | 1/2006 | Kavanagh |
| 2006/0029062 | A1 | 2/2006 | Rao et al. |
| 2006/0045008 | A1 | 3/2006 | Sun et al. |
| 2006/0168655 | A1 | 7/2006 | Grandmaitre et al. |
| 2006/0277569 | A1 | 12/2006 | Smith |
| 2006/0294238 | A1 | 12/2006 | Naik et al. |
| 2007/0101377 | A1 | 5/2007 | Six et al. |
| 2007/0180135 | A1 | 8/2007 | Kenrick et al. |
| 2007/0276925 | A1 | 11/2007 | La Joie et al. |
| 2008/0039010 | A1 | 2/2008 | Vance et al. |
| 2008/0052206 | A1 | 2/2008 | Edwards et al. |
| 2008/0052348 | A1 | 2/2008 | Adler et al. |
| 2008/0077465 | A1 | 3/2008 | Schimpf et al. |
| 2008/0114894 | A1 | 5/2008 | Deshpande |
| 2008/0181208 | A1 | 7/2008 | Maes |
| 2008/0201772 | A1 | 8/2008 | Mondaeev et al. |
| 2008/0207182 | A1 | 8/2008 | Maharajh et al. |
| 2008/0240082 | A1 | 10/2008 | Feldman et al. |
| 2008/0256129 | A1 | 10/2008 | Salinas et al. |
| 2009/0044024 | A1 | 2/2009 | Oberheide et al. |
| 2009/0094113 | A1 | 4/2009 | Berry et al. |
| 2009/0109845 | A1 | 4/2009 | Andreasen et al. |
| 2009/0135752 | A1 | 5/2009 | Su et al. |
| 2009/0156213 | A1 | 6/2009 | Spinelli et al. |
| 2009/0157480 | A1 | 6/2009 | Smith |
| 2009/0187939 | A1 | 7/2009 | Lajoie |
| 2009/0210899 | A1 | 8/2009 | Lawrence-Apfelbaum et al. |
| 2009/0286560 | A1 | 11/2009 | Willis |
| 2009/0300173 | A1 | 12/2009 | Bakman et al. |
| 2010/0035587 | A1 | 2/2010 | Bennett |
| 2010/0066804 | A1 | 3/2010 | Shoemake et al. |
| 2010/0128708 | A1 | 5/2010 | Liu et al. |
| 2010/0157990 | A1 | 6/2010 | Krzyzanowski et al. |
| 2010/0167816 | A1 | 7/2010 | Perlman et al. |
| 2010/0188975 | A1 | 7/2010 | Raleigh |
| 2010/0189004 | A1 | 7/2010 | Mirandette et al. |
| 2010/0218214 | A1 | 8/2010 | Fan et al. |
| 2010/0238840 | A1 | 9/2010 | Lu et al. |
| 2010/0251384 | A1 | 9/2010 | Yen |
| 2010/0312861 | A1 | 12/2010 | Kolhi et al. |
| 2010/0317331 | A1 | 12/2010 | Miller |
| 2011/0019584 | A1 | 1/2011 | Raghavendran et al. |
| 2011/0026584 | A1 | 2/2011 | Zhang et al. |
| 2011/0060851 | A1 | 3/2011 | Monchiero et al. |
| 2011/0069799 | A1 | 3/2011 | Wolfe et al. |
| 2011/0075557 | A1 | 3/2011 | Chowdhury et al. |
| 2011/0075675 | A1 | 3/2011 | Koodli et al. |
| 2011/0082924 | A1 | 4/2011 | Gopalakrishnan |
| 2011/0082946 | A1 | 4/2011 | Gopalakrishnan |
| 2011/0103374 | A1 | 5/2011 | Lajoie et al. |
| 2011/0107364 | A1 | 5/2011 | Lajoie et al. |
| 2011/0107379 | A1 | 5/2011 | Lajoie et al. |
| 2011/0197237 | A1 | 8/2011 | Turner |
| 2011/0211465 | A1 | 9/2011 | Farrugia et al. |
| 2011/0243106 | A1 | 10/2011 | Hsu et al. |
| 2011/0283011 | A1 | 11/2011 | Li et al. |
| 2011/0296046 | A1 | 12/2011 | Arya et al. |
| 2011/0299395 | A1 | 12/2011 | Mariblanca Nieves |
| 2011/0320592 | A1 | 12/2011 | Kemmerer, Jr. et al. |
| 2012/0082132 | A1 | 4/2012 | Andreasen et al. |
| 2012/0190331 | A1 | 7/2012 | Ahmed et al. |
| 2012/0208512 | A1 | 8/2012 | Maharajh et al. |
| 2012/0233247 | A1 | 9/2012 | Ashrafi |
| 2012/0233644 | A1 | 9/2012 | Rao |
| 2012/0281540 | A1 | 11/2012 | Khan et al. |
| 2013/0013800 | A1 | 1/2013 | Brueck et al. |
| 2013/0042015 | A1 | 2/2013 | Begen et al. |
| 2013/0114408 | A1 | 5/2013 | Sastry et al. |
| 2013/0136000 | A1 | 5/2013 | Torres et al. |
| 2013/0137469 | A1 | 5/2013 | Schmidt et al. |
| 2013/0173804 | A1 | 7/2013 | Murthy et al. |
| 2013/0177012 | A1 | 7/2013 | Ku et al. |
| 2013/0208702 | A1 | 8/2013 | Sandberg |
| 2013/0212280 | A1 | 8/2013 | Chesson |
| 2013/0226565 | A1 | 8/2013 | Sung et al. |
| 2015/0127844 | A1* | 5/2015 | Phillips ................ H04L 65/601 709/231 |
| 2015/0256581 | A1* | 9/2015 | Kolhi ................ H04N 21/4126 709/219 |
| 2016/0065995 | A1 | 3/2016 | Phillips |
| 2017/0195393 | A1 | 7/2017 | Su et al. |
| 2019/0069039 | A1* | 2/2019 | Phillips .............. H04N 21/6587 |

OTHER PUBLICATIONS

Chiou, H-J. et al., "Content-aware error-resilient transcoding using prioritized intra-refresh for video streaming", Journal of Visual Communication and Image Representation, vol. 16, pp. 563-588 (2005) (26 pages).

Extended European Search Report issued by the European Patent Office for European Patent Application No. 12868887.6 dated Sep. 9, 2015 (8 pgs.).

International Search Report and Written Opinion issued by the U.S. Patent and Trademark Office as International Searching Authority for International Application No. PCT/US12/59784 dated Mar. 14, 2013 (9 pgs.).

International Search Report and Written Opinion issued by the U.S. Patent and Trademark Office as International Searching Authority for International Application No. PCT/US2011/055183 dated Mar. 8, 2012 (9 pgs.).

International Search Report and Written Opinion issued by the U.S. Patent and Trademark Office as International Searching Authority for International Application No. PCT/US2011/062558 dated Apr. 5, 2012 (7 pgs.).

International Search Report and Written Opinion issued by the U.S. Patent and Trademark Office as International Searching Authority for International Application No. PCT/US2012/021520 dated May 8, 2012 (8 pgs.).

International Search Report and Written Opinion issued by the U.S. Patent and Trademark Office as International Searching Authority for International Application No. PCT/US2012/025577 dated May 21, 2012 (7 pgs.).

Liu, J. et al., "Adaptive Video Multicast Over the Internet", MultiMedia, IEEE, vol. 10, No. 1, pp. 22-33 (Jan.-Mar. 2003) (12 pages).

Sawahashi, M. et al., "Coordinated Multipoint Transmission/Reception Techniques for LTE-Advanced", IEEE Wireless Communications, (pp. 26-34) Jun. 2010 (9 pages).

Widjaja, I. and La Roche, H., "Sizing X2 Bandwidth for Inter-Connected eNBs," Vehicular Technology Conference Fall, 70th IEEE, Piscataway, NJ, USA, 5 pgs. (Sep. 20, 2009).

Xin, J. et al., "Digital Video Transcoding", Proceedings of the IEEE, vol. 93, No. 1, pp. 84-97, (Jan. 2005) (14 pages).

(56) References Cited

OTHER PUBLICATIONS

International Search Report and Written Opinion as issued by the European Patent Office as International Searching Authority in PCT/US19/16294, dated May 2, 2019 (13 pages).

* cited by examiner

| Multimedia Session Domain 202 | Encryption Status 204 | Session Mode 206 | Session Bitrate 208 | Timestamp 210 |
|---|---|---|---|---|
| example1.com | HTTP | 150000 | --- | 56723918 |
| example2.com | HTTPS | --- | 2450000 | 78283011 |
| example3.com | HTTP | 175000 | --- | 98174309 |
| example4.net | HTTP | 145000 | --- | 84629472 |
| example5.com | QUIC | --- | 3500000 | 12347945 |

FIG. 2

ESTIMATING BANDWIDTH SAVINGS FOR ADAPTIVE BIT RATE STREAMING

CROSS-REFERENCE TO RELATED APPLICATIONS

This application claims priority to U.S. Provisional Application No. 62/625,421, filed Feb. 2, 2018, which is incorporated herein by reference.

TECHNICAL FIELD

Embodiments of the present disclosure relate generally to streaming of multimedia, and in particular to estimating savings in adaptive bit rate streaming.

BACKGROUND

Adaptive Bit Rate (ABR) streaming is currently a widely-deployed technology used for streaming of multimedia, for example video or audio, over computer networks. Web servers host multiple versions of video or audio content stored in small, several seconds long segments. An ABR video player detects the available network bandwidth in real time and adjusts the video quality accordingly, for example, by choosing the highest quality of multimedia stream that can be sustained by the network. Even though this technology has many benefits, such as adaptive switching to lower multimedia quality during network congestion, it comes with a cost to network operators. The multimedia ABR streams tend to consume a larger amount of network bandwidth compared to preceding media delivery technologies including progressive downloads. To prevent high bandwidth consumption, network operators rate limit ABR media streams thus enforcing maximum quality of downloaded media—for example enforcing standard definition (SD) rather than high definition (HD) video playbacks—and in that way saving network bandwidth.

Prior techniques to measure network bandwidth savings included measuring network bandwidth utilization without and with ABR rate limiting applied. A network operator measured network bandwidth utilization (e.g., unoptimized bandwidth utilization) with ABR rate limiting disabled over a relatively long duration of time, e.g. 24 hours. Subsequently the measurement (e.g., of optimized bandwidth utilization) was repeated for the same time duration with ABR rate limiting applied. Operators often compared optimized vs unoptimized network consumption, including during peak hours. In running these comparisons, operators wanted to eliminate errors related to occasional network traffic spikes and therefore needed to run the comparisons over long time duration. The bandwidth savings was then calculated as:

Bandwidth Savings=Unoptimized Bandwidth Utilization−Optimized Bandwidth Utilization This process was manual and time consuming. It required planning and engaging network operations personnel. It also required network operator to disable ABR rate limiting for some time and therefore the bandwidth savings were not realized during that time. The savings measurement was not available on continuous basis.

SUMMARY

In some embodiments, a method of determining bandwidth savings from a rate-limiting process includes: determining, by a network optimization node, a first reference characteristic of a first portion of adaptive bit rate (ABR) media data transmitted from a first content provider to a first user equipment while the rate-limiting process is disabled; storing, by the network optimization node in an estimation module database associated with the network optimization node, the first reference characteristic in association with the first content provider; determining, by the network optimization node, a first rate-limited characteristic of a second portion of the ABR media data transmitted from the first content provider to at least one of the first user equipment and a second user equipment while the rate-limiting process is enabled; and calculating, by the network optimization node, a first bandwidth savings for the first content provider associated with the rate-limiting process being enabled based on a difference between the first reference characteristic and the first rate-limited characteristic.

In some further embodiments, the method includes for unencrypted ABR media data, measuring, at the network optimization node, at least one reference segment characteristic from one segment of the first portion of adaptive bitrate (ABR) media data, and wherein the determining the first reference characteristic comprises determining the first reference characteristic based on the at least one reference segment characteristic.

In some further embodiments, the at least one first reference segment characteristic comprises a segment size of the at least one segment of the first portion of adaptive bitrate (ABR) media data.

In some further embodiments, the method includes repeating the measuring, at the network optimization node, the reference segment characteristic for others segments of the first portion of adaptive bitrate (ABR) media data to compile a plurality of reference segment characteristics, and wherein the determining the first reference characteristic comprises determining the first reference characteristic based one or more of a mean, median, or mode of at least some of the plurality reference segment characteristics.

In some further embodiments, the determining the first reference characteristic comprises determining a bitrate of the first portion of ABR media data for encrypted ABR media data.

In some further embodiments, the method includes: determining, by the network optimization node, a second reference characteristic of a third portion of ABR media data transmitted from the first content provider to at least one of the first user equipment, the second user equipment, and a third user equipment while the rate-limiting process is disabled; storing, by the network optimization node in the estimation module database, the second reference characteristic in association with the first content provider; and compiling a combined reference characteristic based on the first reference characteristic and the second reference characteristic, and wherein the comparing the first reference characteristic with the first rate-limited characteristic comprises comparing the combined reference characteristic with the first rate-limited characteristic.

In some further embodiments, the method includes: determining, by the network optimization node, a second reference characteristic of a third portion of ABR media data transmitted from the first content provider to at least one of the first user equipment, the second user equipment, and a third user equipment while the rate-limiting process is disabled, the third portion of ABR media data being different from the first portion of ABR media data; storing, by the network optimization node in the estimation module database, the second reference characteristic in association with the first content provider; determining, by the network optimization node, a second rate-limited characteristic of a fourth portion of ABR media data transmitted from the first content provider to at least one of the first user equipment, the second user equipment, the third user equipment, and a fourth user equipment while the rate-limiting process is enabled, the fourth portion of ABR media data being different from the second portion of ABR media data; and calculating, by the network optimization node, a second bandwidth savings associated with the rate-limiting process being enabled based on a difference between the second reference characteristic and the second rate-limited characteristic.

In some further embodiments, the method includes: determining, by the network optimization node, a second reference characteristic of a third portion of ABR media data transmitted from a second content provider to at least one of the first user equipment, the second user equipment, and a third user equipment while the rate-limiting process is disabled, the second content provider being different from the first content provider; storing, by the network optimization node in the estimation module database, the second reference characteristic in association with the second content provider; determining, by the network optimization node, a second rate-limited characteristic of a fourth portion of ABR media data transmitted from the second content provider to at least one of the first user equipment, the second user equipment, the third user equipment, and a fourth user equipment while the rate-limiting process is enabled; and calculating, by the network optimization node, a second bandwidth savings associated with the rate-limiting process being enabled based on a difference between the second reference characteristic and the second rate-limited characteristic.

In some further embodiments, the determining, by the network optimization node, the first reference characteristic further comprises at least one of: determining the first reference characteristic a predetermined amount of time after determining a previous reference characteristic; determining the first reference characteristic in response to input from a network operator; and determining the first reference characteristic after determining a network condition change exceeding a threshold.

In some further embodiments, the determining, by the network optimization node, the first reference characteristic the predetermined amount of time after determining the previous reference characteristic is performed automatically.

In some embodiments, a system for determining bandwidth savings from a rate limiting process includes: an estimation module database; a network optimization node associated with the estimation module database, wherein the network optimization node comprises a computer readable storage medium having instructions thereon configured to cause a processor of the network optimization node to: determine a first reference characteristic of a first portion of adaptive bit rate (ABR) media data transmitted from a first content provider to a first user equipment while the rate-limiting process is disabled; store in the estimation module database associated with the network optimization node, the first reference characteristic in association with the first content provider; determine a first rate-limited characteristic of a second portion of the ABR media data transmitted from the first content provider to at least one of the first user equipment and a second user equipment while the rate-limiting process is enabled; and calculate a first bandwidth savings for the first content provider associated with the rate-limiting process being enabled based on a difference between the first reference characteristic and the first rate-limited characteristic.

In some further embodiments, for unencrypted ABR media data, the instructions are further configured to cause the processor of the network optimization node to measure at least one reference segment characteristic from one segment of the first portion of adaptive bitrate (ABR) media data, and wherein the determining the first reference characteristic comprises determining the first reference characteristic based on the at least one reference segment characteristic.

In some further embodiments, the at least one first reference segment characteristic comprises a segment size of the at least one segment of the first portion of adaptive bitrate (ABR) media data.

In some further embodiments, the instructions are further configured to cause the processor of the network optimization node to repeat the measuring the reference segment characteristic for others segments of the first portion of adaptive bitrate (ABR) media data to compile a plurality of reference segment characteristics, and wherein the determining the first reference characteristic comprises determining the first reference characteristic based one or more of a mean, median, or mode of at least some of the plurality reference segment characteristics.

In some further embodiments, the determining the first reference characteristic comprises determining a bitrate of the first portion of ABR media data for encrypted ABR media data.

In some further embodiments, the instructions are further configured to cause the processor of the network optimization node to: determine a second reference characteristic of a third portion of ABR media data transmitted from the first content provider to at least one of the first user equipment, the second user equipment, and a third user equipment while the rate-limiting process is disabled; store the second reference characteristic in association with the first content provider in the estimation module database; and compile a combined reference characteristic based on the first reference characteristic and the second reference characteristic, and wherein the comparing the first reference characteristic with the first rate-limited characteristic comprises comparing the combined reference characteristic with the first rate-limited characteristic.

In some further embodiments, the instructions are further configured to cause the processor of the network optimization node to: determine a second reference characteristic of a third portion of ABR media data transmitted from the first content provider to at least one of the first user equipment, the second user equipment, and a third user equipment while the rate-limiting process is disabled, the third portion of ABR media data being different from the first portion of ABR media data; store the second reference characteristic in association with the first content provider in the estimation module database; determine a second rate-limited characteristic of a fourth portion of ABR media data transmitted from the first content provider to at least one of the first user equipment, the second user equipment, the third user equipment, and a fourth user equipment while the rate-limiting process is enabled, the fourth portion of ABR media data being different from the second portion of ABR media data; and calculate a second bandwidth savings associated with the rate-limiting process being enabled based on a difference between the second reference characteristic and the second rate-limited characteristic.

In some further embodiments, the instructions are further configured to cause the processor of the network optimization node to: determine a second reference characteristic of a third portion of ABR media data transmitted from a second content provider to at least one of the first user equipment, the second user equipment, and a third user equipment while the rate-limiting process is disabled, the second content provider being different from the first content provider; store the second reference characteristic in association with the second content provider in the estimation module database; determine a second rate-limited characteristic of a fourth portion of ABR media data transmitted from the second content provider to at least one of the first user equipment, the second user equipment, the third user equipment, and a fourth user equipment while the rate-limiting process is enabled; and calculate a second bandwidth savings associated with the rate-limiting process being enabled based on a difference between the second reference characteristic and the second rate-limited characteristic.

In some further embodiments, the determining the first reference characteristic further comprises at least one of: determining the first reference characteristic a predetermined amount of time after determining a previous reference characteristic; determining the first reference characteristic in response to input from a network operator; and determining the first reference characteristic after determining a network condition change exceeding a threshold.

In some further embodiments, the determining the first reference characteristic the predetermined amount of time after determining the previous reference characteristic is performed automatically.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

FIG. 2 is a diagram showing reference sample parameters stored in an estimation module database, according to some embodiments of the present disclosure.

DETAILED DESCRIPTION

System and methods are described herein for measuring and quantifying the effectiveness of rate limiting of ABR multimedia streams. Some embodiments of the present disclosure describe a mechanism to estimate network bandwidth savings gained from enforcement of a maximum bitrate to an ABR media stream.

Figure 1:
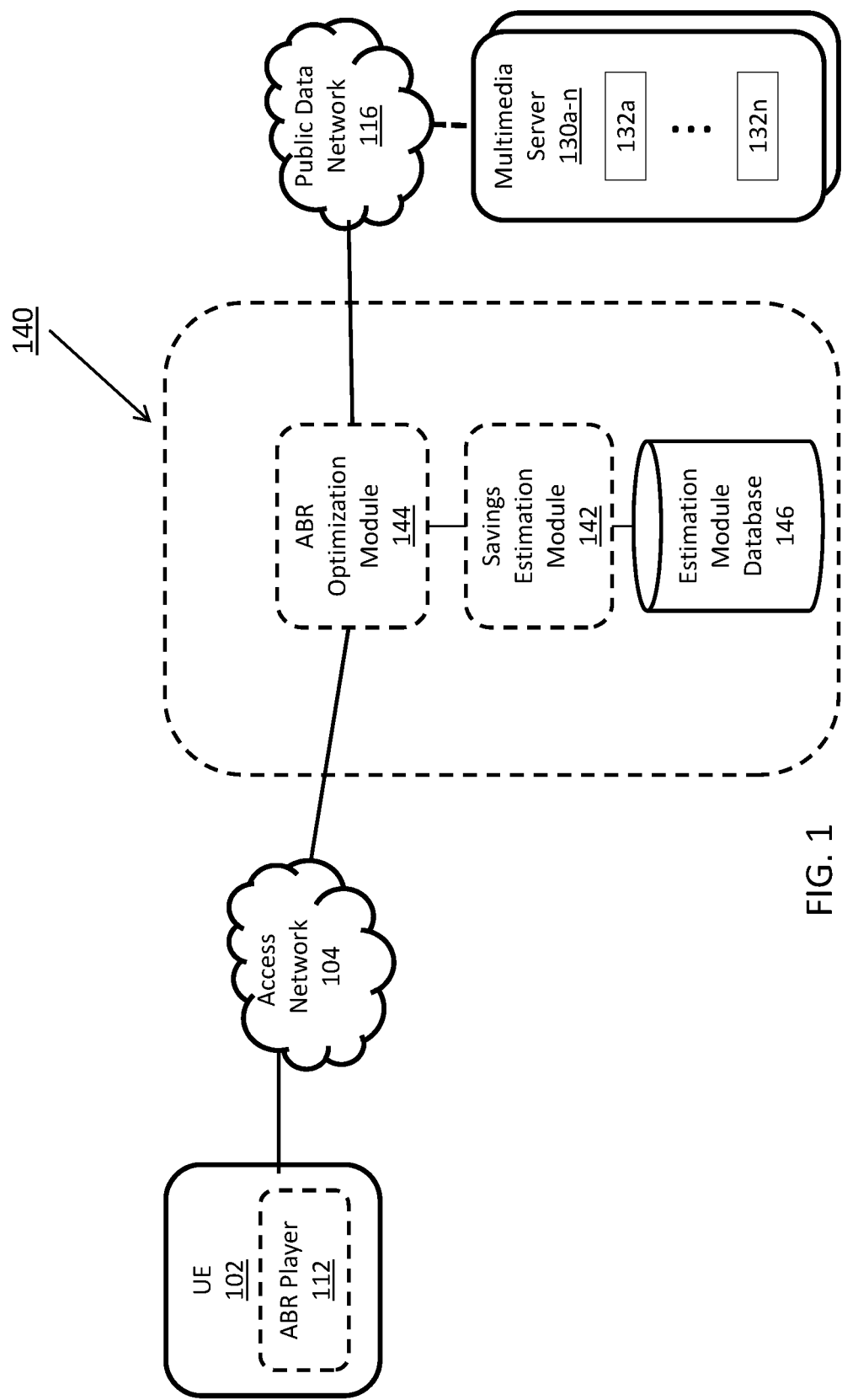
FIG. 1 is a system diagram showing a networked system, according to some embodiments of the present disclosure.

FIG. 1 is a system diagram showing a networked system, according to some embodiments of the present disclosure. System 100 includes user equipment (UE) 102, access network 104, ABR player 112, public data network 116, multimedia servers 130a-n, multimedia segments 132a-n, network optimization node 140, savings estimation module 142, ABR optimization module 144, and estimation module database 146.

UE 102 connects to the networked system 100 through access network 104. UE 102 includes computing devices configured to connect to a mobile data network (e.g., mobile phones, tablets, laptops). ABR player 112 can be, for example, an application or a browser running on the UE 102 that requests media content and plays them as a media stream. As described in more detail below, ABR player 112 can monitor a bit rate of multimedia segments and request future segments at a quality that aligns with the received bitrate. For example, when an ABR player 112 is receiving multimedia stream at a bit rate at which the high definition video cannot be played back in real time, the ABR player 112 may request from the server a lower quality video segment to match the monitored bit rate.

Access network 104 can be, for example, a fixed or mobile access network. A fixed network can include, for example, a digital subscriber line (DSL) or cable network. A mobile access network can be a 3G, 4G, or 5G network, or any future generation network that implements ABR and rate-limiting, or equivalent functions.

As described in more detail below, UE can request and receive media content in the form of multimedia segments 132 from a multimedia server 130. Some embodiments below discuss media content in the form of videos, but the media content can be any type of media to which ABR technology and rate-limiting may be applied.

In some embodiments, a network optimization node 140 can be situated between access network 104 and public network 116. Network optimization node 140 can forward data sent over a transport protocol (e.g., HTTP/HTTPS/QUIC) from the UE to multimedia server 130 or vice versa. Network optimization node 140 can include ABR optimization module 144 and savings estimation module 142. ABR optimization module 144 shapes the received response (e.g., multimedia segments 132) from the multimedia server 130 before sending it to the UE 102. For example, and as described in more detail below, shaping a received response can include receiving multimedia segments at one bitrate from the multimedia server 130a-n and sending the same multimedia segments to the UE 102 at a configured bitrate, which may be different than the received bitrate. ABR player 112 in the UE 102 assembles these multimedia segments and displays multimedia content to the user. Multimedia segments 132a-n of different qualities can be stored at each of the multimedia servers 130a-n (e.g., multimedia server 130a including multimedia segments 132a-n). ABR player 112 can select a segment of a particular quality, which, in some embodiments can be chosen based on network conditions such as, but not limited to, available network bandwidth. The segments stored in the multimedia server can be retrieved using, for example, encrypted (for example HTTPS or QUIC) or unencrypted protocols (for example HTTP). As described in more detail below, savings estimation module 142 collects samples of unencrypted and/or encrypted multimedia streams, stores the samples in estimation module database 146, and uses the stored samples to determine network bandwidth savings for other ABR streams. In some embodiments, as discussed in more detail below, the samples are stored on a per-content-provider-basis. In some embodiments, encrypted and unencrypted segments are treated differently since the savings estimation module 142 uses different parameters and techniques to calculate savings for each of them. One or more of savings estimation module 142 and ABR optimization module 144 functionalities can be integrated into a single module or can be separate nodes within the operator network. In some embodiments, the estimation module database 146 can be local or remote to network optimization node 140. In still further embodiments, the functionality of network optimization node 140 can be spread across a number of network nodes.

Network optimization node 140 can be, for example, a hardware system, virtualized system, or a combination thereof. The functions of ABR optimization module 144 and savings estimation module 142 can be implemented, for example, on hardware, virtual machines, in the cloud, or in a combination thereof. In some embodiments, network optimization node 140 and certain network functions such as, but not limited to a PGW, SGW, PCEF, or an equivalent network function in existing or future generations, can be implemented in a single node. As described in more detail below, network optimization node 140 can be used to implement ABR optimization module 144 and savings estimation module 142 on the same virtual machine or different virtual machines.

When UE 102 requests a multimedia segment from multimedia server 130, the request is received by the network optimization node 140, which in turn forwards the request to the multimedia server 130. The multimedia server 130 sends the response back to the network optimization node 140 which processes it within the ABR optimization module 144. Media detection is performed on the segment received to check if the segment qualifies to be rate-limited. In some embodiments, a segment is qualified to be rate-limited based on a type and/or size of content received from the multimedia server. For example, segments including only text or a small amount of multimedia, for example audio segments, may not qualify to be rate-limited. Once the segment is found to be qualified for rate-limiting, configurable parameters (e.g., burst and/or bitrate) are enforced on the segment that is sent to the UE 102. Enforcement of these parameters (e.g., shaping the segments) can include delivering initial data segments or portions of segments in a burst (e.g., at network speed) and subsequent data segments at a configured bitrate. In some embodiments, since multimedia segments delivered by a media server can be equally divided in time and available at different qualities, ABR player 112 can independently request any quality. However, depending upon the rate at which ABR player 112 receives the multimedia segment, it can decide whether the multimedia stream of a given quality can be played in real-time with the currently-monitored receive bitrate as monitored by the ABR player 112, and request multimedia segments at a different bit rate if that condition is not met (e.g., requesting a lower quality segment if the current bit rate is not sufficient for a higher quality segment). In this way, providing rate-limited content to a UE can be used to trigger UE to request a different quality of media content, such as video data.

FIG. 2 is a diagram showing reference sample parameters stored, for example, in the estimation module database 146 of FIG. 1, according to some embodiments of the present disclosure. According to some embodiments, the estimation module database 146 is located elsewhere in the network. FIG. 2 shows multimedia segment domain 202, encryption status 204, session mode 206, session bitrate 208, and timestamp 210 as measured, for example, by the ABR optimization module 144.

Multimedia session domain 202 tracks the content provider website from which the multimedia segment was requested by the ABR player 112. Multimedia session domain values can include, for example, one or more of an identifier of a content provider website such as a domain (e.g., example1.com, example2.com) or an IP address. In some embodiments, it is not practically possible to process all multimedia streams from each server with and without ABR rate-limiting for the purpose of calculating network bandwidth savings. To overcome this challenge, an assumption can be made that content providers typically choose to store the same set of quality levels of multimedia content. For example, a content provider usually stores tens of thousands of different videos. Thus, when estimating bandwidth savings, a network operator can sample bandwidth metrics on a per-content provider basis rather than tracking bandwidth across the entire network. For the purposes of estimating bandwidth savings, the network optimization node 140, in some embodiments, can track only parameters of a certain subset of non-ABR traffic from a particular server so as to obtain sample with which to compare future traffic. In some embodiments, only one video per content server is tracked (e.g., where parameters are recorded for non-ABR streaming of the video). In some embodiments, the sample video can include any video data from a given domain, regardless of UE session or video identity, at the time that tracking (e.g., updating). After obtaining sample data, ABR traffic can be monitored and compared to the sample data to determine savings for ABR traffic on a per-content provider basis. This allows the process to be automated, and significantly reduces the implementation costs each time a network operator needs to measure bandwidth savings.

Encryption status 204 provides information if the content provider website is encrypted or unencrypted (e.g., HTTP associated with unencrypted content, and HTTPS and QUIC associated with encrypted content). In some examples, encryption status can be determined based on the type of traffic and/or the server port to which the traffic is destined. In some embodiments, as discussed below, encryption status can be used to determine what parameter is used to track bandwidth savings for a particular content provider.

Session mode 206 can refer to a segment length that appears the most frequently during the course of a particular session. In some embodiments, segment lengths are normalized (e.g., rounded to a nearest value such as to the nearest 0.1 MB) and the normalized segment length that appears most often is chosen. As described in more detail below, the number of bytes in each of the multimedia segments corresponding to a single multimedia content (e.g., a discrete video) can be tracked and "mode" is derived from these values. In some embodiments, the mode can refer to the mathematical term "mode", which is a value that appears the most frequently. Thus, in an example, the most common segment length over the course of a session can be stored as the session mode 206. In some embodiments, one or more of the median or mean can be derived and stored in estimation module database 146 in addition or instead of mode. The segment in a multimedia content length determined using one or more of mode, median, and mean of segment length for each segment is stored in addition to or as session mode 206 in the module database. For the purpose of the present disclosure, it should be understood that session mode 206 can refer to one or more of these quantities. In some embodiments, a set of random samples of segment lengths are used instead of or in addition to the above-referenced parameters. In FIG. 2, for example, the most frequently occurring segment length associated with a example1.com session can be 150,000 bytes. Also, as shown in FIG. 2, session mode can be stored for example1.com, example3.com, and example4.com. As described in more detail below, in some embodiments, session mode is used to estimate byte savings for unencrypted multimedia alone.

Session bitrate 208 can refer to a rate at which media is delivered from a particular website, for example from a multimedia server 130a-n to UE 102, according to some embodiments. Session bitrate 208 can be determined by dividing an amount of multimedia content delivered during a session by the time it took to deliver the multimedia content. This can be tracked, for example, by inspecting traffic between a particular UE 102 and a particular multimedia server 130a-n. The savings estimation module can use the UE and multimedia server IP and port to track a session across which the session bitrate 208 is calculated. Session bitrate 208 can be expressed, in some embodiments, in bits per second. For example, as shown in FIG. 2, the session bitrate associated with media from example2.com is 2,450,000 bits per second. As shown in FIG. 2, session bitrate 208 can be stored for example2.com and example5.com. As described in more detail below, in some embodiments, session bitrate 208 is used to estimate byte savings for encrypted multimedia alone. Session bitrate 208 can be used when Session Mode 206 cannot be calculated, for example for encrypted content providers (e.g., those that use HTTPS or QUIC). However, whether session mode 206 or session bitrate 208 is used is not limiting, and either or both can be used depending on whether such parameters can be calculated from traffic from particular domains.

The timestamp 210 can refer to a time at which the reference sample was calculated (e.g., when measurements associated with a session (such as session mode 206 or session bitrate 208) are taken), according to some embodiments. Timestamp 210 can be tracked and stored, for example in estimation module database 146 or at another network node, and used later to validate and refresh reference samples. In some embodiments, the timestamp 210 is used to determine when a reference sample is stale and thus when a new reference sample should be taken. Timestamp 210 can be expressed in terms of time of day (e.g., day, hour, minute, second) or in terms of an operating system time (e.g., seconds from Unix Epoch as shown in FIG. 2).

Figure 3:
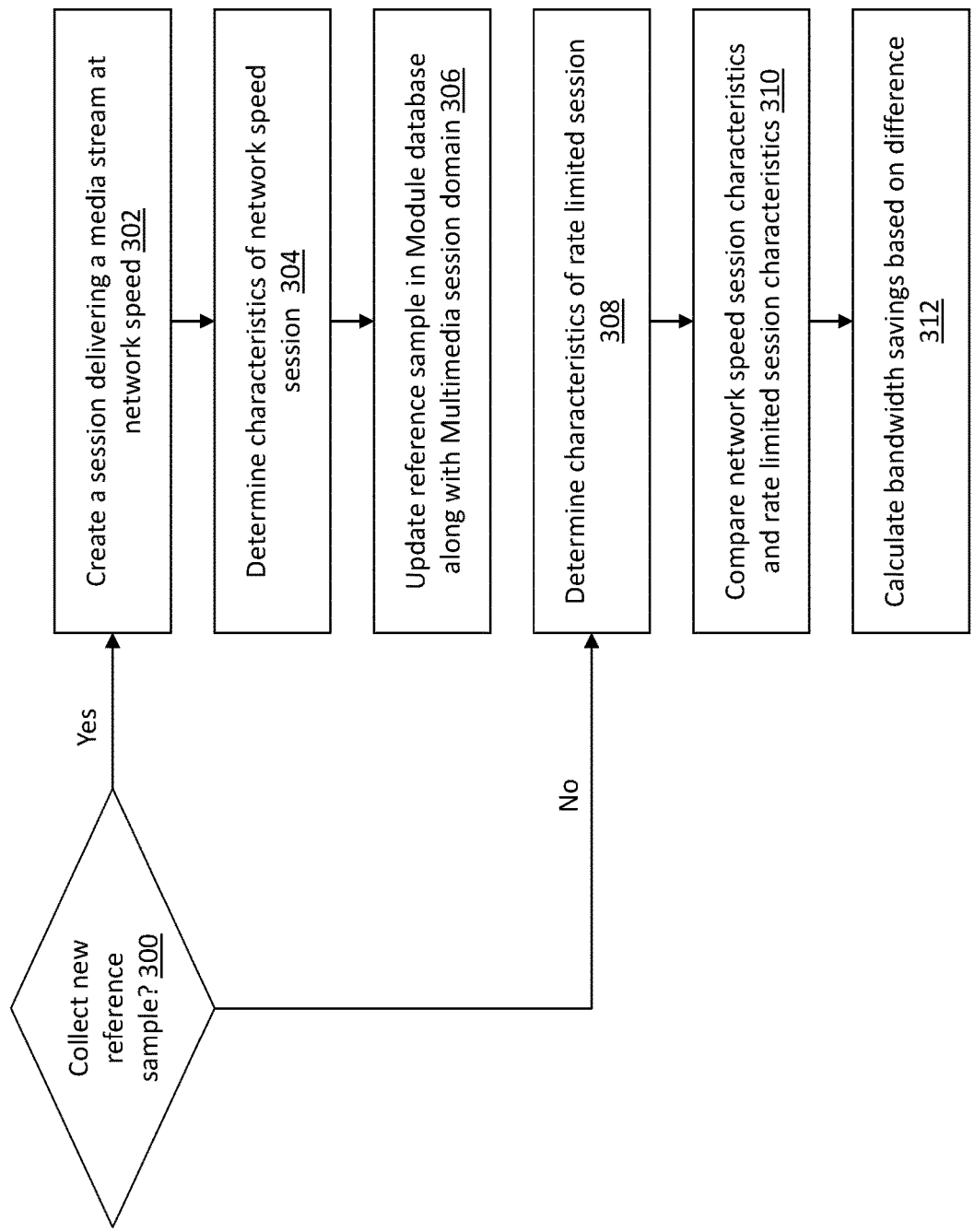
FIG. 3 is a flowchart showing a process for estimating bandwidth savings using ABR, according to some embodiments of the present disclosure.

FIG. 3 is a flowchart showing a process for estimating bandwidth savings using ABR, according to some embodiments of the present disclosure.

Referring to step 300, the savings estimation module 142 determines whether to collect a reference sample. In some embodiments, a reference sample is collected when a reference sample is not available for a given content provider web site or if the savings estimation module 142 determines to collect a new periodic sample. In some embodiments, the savings estimation module 142 collects a new periodic sample when the available reference sample is stale. A sample can become stale when a collected sample is older than a threshold (e.g., 48 hours). The frequency at which the values are recollected can be configurable by, for example, a network operator. When the savings estimation module 142 determines that a new reference sample is to be collected, the process proceeds to step 302. When the savings estimation module 142 determines that a new reference sample is not to be collected, the process proceeds to 308.

Referring to step 302, the savings estimation module 142 creates a session delivering a media stream at network speed. In some embodiments, the savings estimation module 142 periodically bypasses rate limiting and delivers a media stream at the rate supported by network, also referred to as the network speed or with ABR disabled. In this case, an ABR player 112 streams the highest available media quality as supported by the network.

Referring to step 304, the savings estimation module 142 determines characteristics of a network speed session. As described in more detail herein, for example, with reference to FIG. 2, characteristics of the network speed session can include whether a session includes encrypted or unencrypted media, a size of each segment in the media stream, a session duration, a number of bytes downloaded, a timestamp, and a session bitrate. These parameters can be collected for all session segments, or for a large subset of segments. In some embodiments, only video segments are tracked.

Referring to step 306, the savings estimation module 142 selects the session with characteristics to create a reference sample. In some embodiments, the savings estimation module 142 determines the request encryption type and uses the appropriate parameters, such as those listed in FIG. 2, to arrive at the reference sample. This session specific information along with the request timestamp is saved in the estimation module database 146 with multimedia session domain 202 as its key. In some embodiments, reference samples are collected separately for each unique content provider web site 130a-130n. According to some embodiments, it can be assumed that different content providers may store different quality levels of multimedia files, but that each content provider typically chooses to store the same set of quality levels of multimedia files. Accordingly, a small sample for a given content provider can be used, rather than a large sample across all network traffic, in order to calculate reliable savings statistics. These samples can be stored in association with the particular content providers.

Referring to step 308, when no new reference sample is to be collected 300, the savings estimation module 142 determines characteristics of a rate limited session. As described in more detail above, a rate limited session is a session where ABR shaping is applied (e.g., enabled) and multimedia segments are delivered to the UE 102 at a configured rate. Rate limited session characteristics can include the same characteristics determined for the reference sessions (e.g., one or more of multimedia session domain 202, encryption status 204, and session mode 206, or session bitrate 208).

Referring to step 310, the savings estimation module 142 retrieves the network speed session characteristics from the estimation module database 146 for a particular multimedia session domain and compares it with the rate limited session characteristics. Savings estimation module 142 retrieves a reference session with a multimedia session domain 202 matching the multimedia session domain of the rate limited session (e.g., network speed session characteristics stored in association with example1.com is compared to rate limited session characteristics associated with example1.com). As described in more detail below, this comparison can include comparing or calculating a difference between, for example, segment sizes, session bitrates, or a combination thereof associated with each of the network speed session and the rate limited session. In some embodiments, the calculation includes a comparison of calculated session bitrates and/or a difference between segment sizes. Accordingly, by comparing the stored reference session characteristic with the current rate limited session characteristic, bandwidth savings can be estimated in real time. The steps 300 and 308-312 can be repeated to continuously monitor bandwidth savings until a new reference sample 300 is required, at which point the method returns to step 302.

Figure 4:
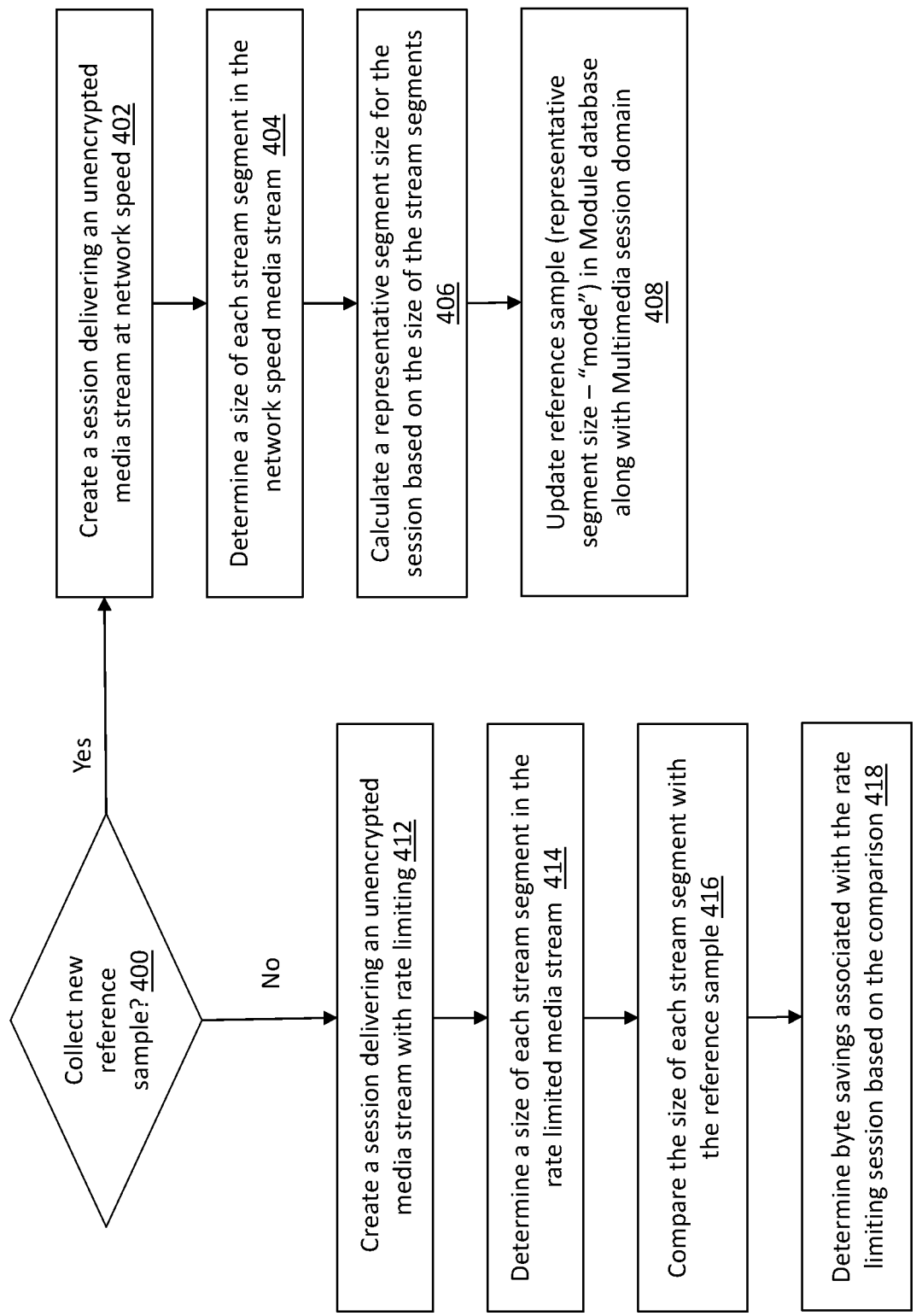
FIG. 4 is a flowchart showing a process for determining byte savings associated with a rate limited unencrypted ABR session, according to some embodiments of the present disclosure.
Figure 5:
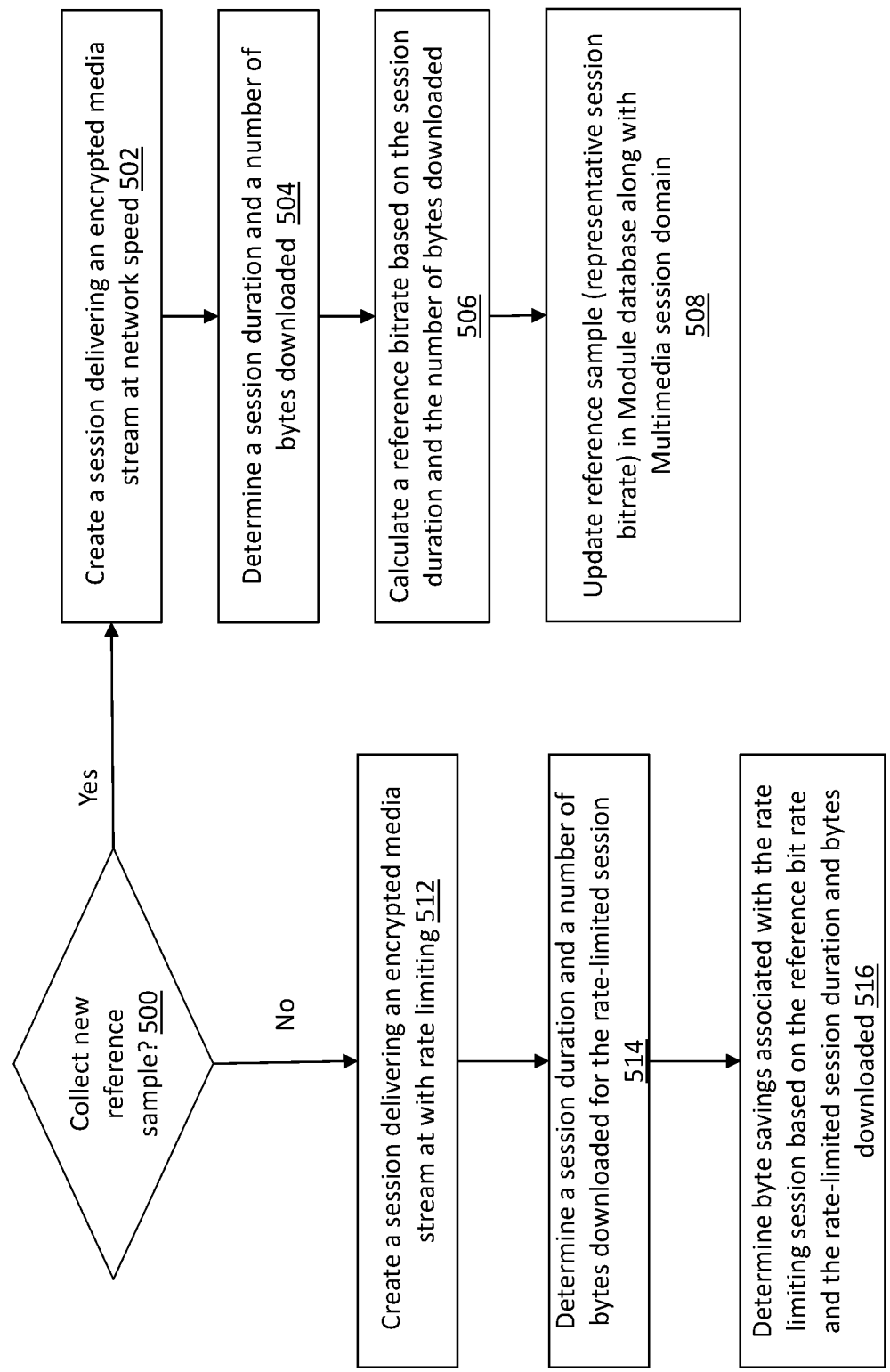
FIG. 5 is a flowchart showing a process for determining byte savings associated with a rate limited encrypted ABR session, according to some embodiments of the present disclosure.

FIGS. 4 and 5 show embodiments of the process for determining byte savings. In some embodiments, the savings estimation module 142 can determine whether to use the process of FIG. 4 or FIG. 5 based on a characteristic of an ABR session, for example, based on encryption status 204 as discussed above.

FIG. 4 is a flowchart showing a process for determining byte savings associated with a rate limited ABR session, such as an unencrypted ABR session or any other session for which segment sizes can be determined, according to some embodiments of the present disclosure.

Referring to step 400, the savings estimation module 142 can determine whether to collect a reference sample, for example, based on whether an existing sample is stale. In some embodiments, the process in step 400 is similar to the process described in step 300 shown in FIG. 3 and described in the accompanying text. When the savings estimation module 142 determines that a new reference sample is to be collected, the process proceeds to step 402. When the savings estimation module 142 determines that a new reference sample is not to be collected, the process proceeds to 412.

Referring to step 402, the savings estimation module 142 creates a session delivering, for example, an unencrypted media stream at network speed. In some embodiments, the savings estimation module 142 does so by bypassing rate limiting, and delivering an unencrypted media stream at the rate supported by network, also referred to as the network speed or with ABR disabled. In this case, an ABR player 112 streams the highest available media quality as supported by the network, rather than the highest available media quality limited by the ABR optimization node 140.

In some embodiments, an unencrypted media stream can refer to a media stream that is transmitted in clear text over a HTTP session. The media stream content can be examined by the ABR optimization module 144 which performs media detection (e.g., the ABR optimization module 144 has access to the data payload). In some embodiments, the type of ABR media is detected, for example, by analyzing the transferred segment content and determining that the segment contains ABR media and further whether the media is encrypted or not. Certain content providers opt to provide unencrypted content since encryption adds further processing and overhead to the media stream content.

Referring to step 404, the savings estimation module 142 determines a size of each stream segment in the network speed media stream, for example by measuring the number of bytes of a message traversing the ABR optimization module 144. As described above, each media stream can be broken into multiple segments for delivery to a UE 102. Segment size can vary based on, for example the amount of information encoded in a segment (e.g., a scene with relatively still images versus a scene with a lot of action) and the quality level of media content being served. The quality of the media content being served can vary based on a UE 102 requesting different quality levels of video, for example, at the start of streaming a video (e.g., to adjust to network conditions). Tracking all the segment sizes for a given session can be used to calculate an average estimate of the quality level and content type of overall media content being served. When normalizing segment sizes to a certain value (e.g., a 0.1 MB) segment sizes are approximately the same for media segments pertaining to a single quality level. However, the same media segment from different quality levels can be of a different size. As discussed above, since many content providers use the same quality levels for each media content, determining bandwidth savings as described herein can be used to estimate bandwidth savings across all delivered media contents.

In some embodiments, segments with segment sizes lower than a threshold (e.g., 200 KB) are excluded from the determination. Small segments, in some embodiments, are excluded because they likely contain non-video data. For example, segments around 200 KB or less often contain audio or text (e.g., subtitles), that may not be indicative of the overall bandwidth savings achieved by rate-limiting. In some embodiments, a maximum threshold can be implemented as well, since, in some examples, some complete video files are not split into segments, in which case ABR may not be applied since there may be no effect in implementing rate-limiting.

In some embodiments, the segment lengths are stored during the step 404, for example locally to the savings estimation module 142 or in the estimation module database 146. The stored segment lengths can be used to calculate a characteristic of the session, such as the mean, median, or mode as described with reference to step 406.

Referring to step 406, the savings estimation module 142 calculates a representative segment size for the session based on the size of the stream segments. In some embodiments, when an ABR streaming session completes (e.g., when it is determined that no activity between a particular UE and multimedia server has occurred for a predetermined time), a mode (the mathematical term for the most often repeated number) for that session is calculated from all recorded segment sizes (or, in the case where thresholds are enforced and where the enforcement occurs after recording, for all those segments sizes recorded segments that pass a threshold). The mode is saved for future reference. In some embodiments, the mean or median segment size can be used as an alternative to or in addition to the mode.

Referring to step 408, the savings estimation module 142 updates the reference sample information in the estimation module database 146 with the representative sample size calculated from step 406. This can be stored in association with the particular content provider. As discussed below, this reference sample can be used for comparison with real-time data in order to determine real-time savings estimates.

Referring to step 412, when a new reference sample does not need to be collected 400, the savings estimation module 142 creates a session delivering an unencrypted media stream with rate limiting activated. As described above, this session is created based on a request from a UE 102 for content that is eligible for rate limiting.

Referring to step 414, the savings estimation module 142 determines a size of each stream segment in the rate limited media stream. As described above, each media stream can be broken into multiple segments for delivery to a UE 102, and the segments can vary in size based on the quality level being served and the content type of the segments.

Referring to step 416, the savings estimation module 142 determines a segment size (e.g., the mode, mean, median, or combination thereof) for a requested multimedia session domain and compares the size of each stream segment with the reference sample to determine savings on a per-segment basis. In some embodiments, the comparison includes calculating a difference between the reference network-speed segment size (e.g., mode) and the rate-limited segment size.

Referring to step 418, the savings estimation module 142 determines byte savings associated with the rate limiting session based on the segment comparisons. In some embodiments, if the segment is smaller than the reference sample size the difference is an estimated network bandwidth savings in bytes for that given ABR segment. In some embodiments, the segment savings are added to the total savings achieved for the ABR streaming session, e.g.:

Byte Savings=Σ (reference network-speed segment size mode−rate-limited segment size)

Byte Savings=reference network-speed segment size mode*number of segments−Σ (rate-limited segment size)

Accordingly, bandwidth savings can be calculated in real-time for each session associated with individual content providers.

FIG. 5 is a flowchart showing a process for determining byte savings associated with, for example, a rate limited encrypted ABR session, or any other ABR session in which a session bitrate 208 rather than session mode is used in estimating savings, according to some embodiments of the present disclosure.

Referring to step 500, the savings estimation module 142 determines whether to collect a reference sample, for example, based on whether an existing sample is stale. In some embodiments, the process in step 500 is similar to the process described in step 300 shown in FIG. 3 and described in the accompanying text. When the savings estimation module 142 determines that a new reference sample is to be collected, the process proceeds to step 502. When the savings estimation module 142 determines that a new reference sample is not to be collected, the process proceeds to 512.

Referring to step 502, the savings estimation module 142 creates a session delivering an encrypted media stream at network speed. In some embodiments, the savings estimation module 142 does so by bypassing rate limiting and delivering an encrypted media stream at the rate supported by network, also referred to as the network speed. In this case, an ABR player 112 streams the highest available media quality as supported by the network, rather than the highest available media quality limited by the ABR optimization node 140.

An encrypted media stream can refer to a media stream that is transmitted over an encrypted HTTPS or encrypted QUIC connection, according to some embodiments. Except for the multimedia server 130 and the UE 102, other entities without a key cannot decipher the media stream. Encryption can enhance the security of media stream.

Referring to step 504, the savings estimation module 142 determines a session duration and a number of bytes downloaded, for example based on measuring data flow for a session between a particular UE and a particular media server. In some embodiments, only the "active" session duration is determined (e.g., the idle time at the start and end of a session is ignored). As described below, a session bitrate can be determined based on the (active) session duration and the total number of bytes downloaded. Session bit rate, instead of segment size as discussed with reference to FIG. 4, can be used for an encrypted session because, in some embodiments, it can be difficult to interpret encrypted media stream content (and therefore segment sizes). A POSITA would understand from the present disclosure that bitrate can be used on unencrypted media streams as well.

Referring to step 506, the savings estimation module 142 calculates a reference bitrate based on the active session duration and the number of bits downloaded, e.g.:

Reference Bitrate=(total bits downloaded)/(active session duration)

Referring to step 508, the savings estimation module 142 updates the reference sample information in the estimation module database 146 with the representative bit rate calculated from step 506. This can be stored in association with the particular content provider. As discussed below, this reference sample can be used for comparison with real-time data in order to determine real-time savings estimates.

Referring to step 512, the savings estimation module 142 creates a session delivering an encrypted media stream with rate limiting activated. As described above, this session is created based on a request from a UE 102 for content that is designated for rate limiting.

Referring to step 514, the savings estimation module 142 determines a session duration and a number of bytes downloaded for the rate-limited session. In some embodiments, only the "active" session duration is determined and the idle time at the start and end of a session is ignored.

Referring to step 516, the savings estimation module 142 retrieves the reference bitrate from the estimation module database 146. The savings estimation module 142 then determines byte savings associated with the rate limiting session based on the reference bit rate and the rate-limited session duration and bytes downloaded. In some embodiments, the byte savings is expressed as the following:

Byte Savings=(reference network-speed bitrate*rate-limited session duration*8)−(rate-limited bytes)

Accordingly, bandwidth savings can be calculated in real-time for each session associated with individual content providers.

In some embodiments, the techniques described with reference to FIGS. 3-5 can be implemented using a plurality of reference samples. For example, estimation module database can maintain a plurality of reference samples for each given content provider, and can use a mean, median, mode, time-weighted average, or another mathematical or algorithmic combination of accumulated reference samples in order to determine a reference value. For example, for a particular content provider, the reference characteristic could be an average of samples taken every 4 hours. Every four hours, the oldest sample is dropped from the average and a new sample is taken as described with reference to one or more of FIGS. 3-5.

In some embodiments, collected reference samples can be rejected as outliers based on thresholds. For example, where a plurality of samples is taken, those falling outside a particular percentage from the average sample size or bitrate can be rejected. In some embodiments static thresholds are applied. These outliers can be indicative of things like network congestion or samples that otherwise were not in conformity with normal traffic. When individual samples are taken, new reference samples can be rejected if they deviate too far from the previous samples. In such a case, a new sample can be taken immediately following or after a predetermined time has elapsed from the rejected sample. Meanwhile, the previous reference sample can be used.

In some embodiments the savings optimization module 142 can determine whether to use the method described with reference to FIG. 4 or FIG. 5 based on a characteristic of network traffic. For example, traffic identified as unencrypted traffic can be directed to the method of FIG. 4 whereas traffic identified as encrypted traffic can be directed to the method of FIG. 5. In some embodiments all traffic is directed to the method of FIG. 5.

In some embodiments, advantages of the techniques described herein include measuring bandwidth savings in service on an ongoing basis. Bandwidth metrics are available at any point in time and can be continuously collected and presented by network monitoring equipment. Another advantage of the techniques described herein is that the bandwidth measurement can be fully automated, in some embodiments. In contrast to the prior art, the bandwidth measurement techniques described herein do not require planning and engaging a network operations team to perform manual steps. Furthermore, the techniques described herein can in some embodiments provide a greater degree of granularity, such as, but not limited to determining the bandwidth savings for particular content providers or periods of time. Accordingly, network usage and bandwidth savings can be more closely monitored.

In some embodiments, the techniques described herein also allow for savings estimations to apply to both unencrypted and encrypted ABR video streams. The techniques described herein can, in some embodiments, be used to tune ABR bitrate enforced to achieve maximum bandwidth savings without impacting subscriber experience, for example by finding a minimum bitrate which still delivers video stream of good quality. This can be accomplished, for example, by configuring various bitrates and observing the impact on video quality and/or bandwidths savings. Metrics such as unoptimized bitrate, optimized bitrate, bandwidth savings can be traced on a per network domain and overall basis and the metrics can be used by network operators to troubleshoot anomalies in the traffic patterns.

The techniques described herein can also, in some embodiments, allow for quantifying bandwidth savings. This helps to better understand the impact of applying ABR rate limiting on the network. Bandwidth savings can be increased when desired, which can translate to lowering network resource utilization for the same or similar quality of experience. Network operators can estimate the network bandwidth savings and monetary savings obtained from ABR rate limiting.

In some embodiments of the present disclosure, systems and methods are provided for determining savings associated with applying adaptive bit rate techniques on a multimedia stream. In some embodiments, a computing device receives multimedia segments from a rate-limited session, determines an encryption status of the multimedia segments, and determines a bit savings associated with the rate-limited session based on the encryption status. In some embodiments, when the encryption status indicates that the multimedia segments are unencrypted, the computing device determines for each segment of the multimedia segments a size of the segment, calculates for each segment of the multimedia segments a difference between the size of the segment and a reference multimedia segment size, and calculates the bit savings based on a sum of the difference associated with each segment of the multimedia segments. In some embodiments, when the encryption status indicates that the multimedia segments are encrypted, the computing device determines a session duration for the rate-limited session, and calculates the bit savings based a difference between the session duration and a reference duration.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A method of determining bandwidth savings from a rate-limiting process, the method comprising:
    determining, by a network optimization node, a reference characteristic of a first portion of media data transmitted from a first content provider to a first user equipment while adaptive bit rate (ABR) shaping is disabled;
    storing, by the network optimization node in an estimation module database associated with the network optimization node, the reference characteristic in association with the first content provider;
    determining, by the network optimization node, a rate-limited characteristic of a second portion of the media data transmitted from the first content provider to at least one of the first user equipment and a second user equipment while the ABR shaping is enabled; and
    calculating, by the network optimization node, a first bandwidth savings for the first content provider associated with the ABR shaping being enabled based on a difference between the first reference characteristic and the rate-limited characteristic.

2. The method of claim 1, further comprising for unencrypted media data, measuring, at the network optimization node, at least one reference segment characteristic from one segment of the first portion of the media data, and wherein the determining the reference characteristic comprises determining the reference characteristic based on the at least one reference segment characteristic.

3. The method of claim 2, wherein the at least one first reference segment characteristic comprises a segment size of the at least one reference segment of the first portion the media data.

4. The method of claim 2, further comprising repeating the measuring, at the network optimization node, the reference segment characteristic for other segments of the first portion of the media data to compile a plurality of reference segment characteristics, and wherein the determining the reference characteristic comprises determining the reference characteristic based on one or more of a mean, median, or mode of at least some of the plurality reference segment characteristics.

5. The method of claim 1, wherein the determining the reference characteristic comprises determining a bitrate of the first portion of the media data for encrypted media data.

6. The method of claim 1, wherein the determining, by the network optimization node, the reference characteristic further comprises at least one of:
    determining the reference characteristic a predetermined amount of time after determining a previous reference characteristic;
    determining the reference characteristic in response to input from a network operator; and
    determining the reference characteristic after determining a network condition change exceeding a threshold.

7. The method of claim 6, wherein the determining, by the network optimization node, the reference characteristic the predetermined amount of time after determining the previous reference characteristic is performed automatically.

8. A system for determining bandwidth savings from a rate limiting process, comprising:
    an estimation module database; and
    a network optimization node associated with the estimation module database, wherein the network optimization node comprises a computer readable storage medium having instructions thereon configured to cause a processor of the network optimization node to:
        determine a reference characteristic of a first portion of media data transmitted from a first content provider to a first user equipment while adaptive bit rate (ABR) shaping is disabled;
        store in the estimation module database associated with the network optimization node, the reference characteristic in association with the first content provider;
        determine a rate-limited characteristic of a second portion of the media data transmitted from the first content provider to at least one of the first user equipment and a second user equipment while the ABR shaping is enabled; and
        calculate a first bandwidth savings for the first content provider associated with the ABR shaping being enabled based on a difference between the reference characteristic and the first rate-limited characteristic.

9. The system of claim 8, wherein for unencrypted media data, the instructions are further configured to cause the processor of the network optimization node to measure at least one reference segment characteristic from one segment of the first portion of the media data, and wherein the determining the reference characteristic comprises determining the reference characteristic based on the at least one reference segment characteristic.

10. The system of claim 9, wherein the at least one reference segment characteristic comprises a segment size of the at least one reference segment of the first portion of the media data.

11. The system of claim 9, wherein the instructions are further configured to cause the processor of the network optimization node to repeat the measuring the reference segment characteristic for other segments of the first portion of the media data to compile a plurality of reference segment characteristics, and wherein the determining the reference characteristic comprises determining the reference characteristic based on one or more of a mean, median, or mode of at least some of the plurality of reference segment characteristics.

12. The system of claim 8, wherein determining the reference characteristic comprises determining a bitrate of the first portion of the media data for encrypted media data.

13. The system of claim 8, wherein the determining the reference characteristic further comprises at least one of:
   determining the reference characteristic a predetermined amount of time after determining a previous reference characteristic;
   determining the reference characteristic in response to input from a network operator; and
   determining the reference characteristic after determining a network condition change exceeding a threshold.

14. The system of claim 13, wherein the determining the reference characteristic the predetermined amount of time after determining the previous reference characteristic is performed automatically.

\* \* \* \* \*